(12) United States Patent
Heimann et al.

(10) Patent No.: US 11,685,864 B2
(45) Date of Patent: Jun. 27, 2023

(54) SYSTEM FOR PRODUCING BIOCOAL AND BIOCHAR USING A ROTARY COMPRESSION UNIT

(71) Applicant: ECAP BIOENERGY, LLC, Mexico, MO (US)

(72) Inventors: Robert L Heimann, Centralia, MO (US); Allison Talley, Mexico, MO (US); Lucy Mills, Centralia, MO (US); Nancy Heimann, Centralia, MO (US)

(73) Assignee: ECAP BIOENERGY, LLC, Mexico, MO (US)

( * ) Notice: Subject to any disclaimer, the term of this patent is extended or adjusted under 35 U.S.C. 154(b) by 422 days.

(21) Appl. No.: 15/800,547

(22) Filed: Nov. 1, 2017

(65) Prior Publication Data
US 2018/0119020 A1 May 3, 2018

Related U.S. Application Data

(60) Provisional application No. 62/415,831, filed on Nov. 1, 2016.

(51) Int. Cl.
*C10L 5/44* (2006.01)
*C10L 9/08* (2006.01)
(Continued)

(52) U.S. Cl.
CPC ............ *C10B 53/02* (2013.01); *C05F 11/02* (2013.01); *C10B 7/10* (2013.01); *C10B 47/44* (2013.01);
(Continued)

(58) Field of Classification Search
CPC ...... C10L 5/447; C10L 9/083; C10L 2290/02; C10L 2290/30; C10L 5/44; C10L 2200/0469; C10L 2290/50; C10L 5/47
See application file for complete search history.

(56) References Cited

U.S. PATENT DOCUMENTS 4,208,251 A 6/1980 Rasmussen
5,847,248 A 12/1998 Bridle et al.
(Continued)

FOREIGN PATENT DOCUMENTS

CA 2731126 A1 * 8/2012 ............. C10L 9/083
DE 102007059982 7/2009
(Continued)

OTHER PUBLICATIONS

Dahmen, N. et al.. Synthesis Gas from Biomass—Problems and Solutions en route to Technical Realization, Oil Gas European Magazine Jan. 2007, Jan. 1, 2007, pp. OG31-OG34, XP055466818, DOI: 10.1016/j.enconman.2009.08.013, retrieved from the internet URL:https://www.bioliq.de/downloads/Oil_Gas_eng_2007.pdf.
(Continued)

*Primary Examiner* — Ellen M McAvoy
*Assistant Examiner* — Ming Cheung Po
(74) *Attorney, Agent, or Firm* — The Small Patent Law Group LLC; Jay J. Hoette

(57) ABSTRACT

A system for producing biocoal and biochar includes at least one rotary compression unit (RCU) having a barrel, a compression screw housed within the barrel, a feed for receiving biomass and at least one exit for releasing biochar and gasses formed in the RCU. A first exit stream is produced that includes biochar and a portion of the remaining gasses, and a second exit stream is produced that includes biocoal. A gas crossover is provided that connects the first and second exit stream having a mechanism for transporting gasses from the first exit stream to the second exit stream thereby condensing a portion of the remaining gasses into the biocoal. In one form two RCUs are included connected to two condensers.

8 Claims, 2 Drawing Sheets

(51) Int. Cl.
    *C10B 53/02*    (2006.01)
    *C10B 57/00*    (2006.01)
    *C10B 47/44*    (2006.01)
    *C10K 1/04*    (2006.01)
    *C10B 7/10*    (2006.01)
    *C05F 11/02*    (2006.01)

(52) U.S. Cl.
    CPC ............ *C10B 57/005* (2013.01); *C10K 1/046* (2013.01); *C10L 5/447* (2013.01); *Y02E 50/10* (2013.01); *Y02E 50/30* (2013.01); *Y02P 20/145* (2015.11)

(56) References Cited

U.S. PATENT DOCUMENTS

| | | | | |
|---|---|---|---|---|
| 8,667,706 | B2 * | 3/2014 | Smith | B30B 11/225<br>34/381 |
| 10,392,564 | B2 * | 8/2019 | Heimann | C10B 47/44 |
| 2009/0007484 | A1 * | 1/2009 | Smith | C10G 1/02<br>44/606 |
| 2015/0007446 | A1 * | 1/2015 | Robert | F26B 25/14<br>34/108 |
| 2016/0312123 | A1 | 10/2016 | Heimann | |

FOREIGN PATENT DOCUMENTS

| WO | WO-2012167796 A1 * | 12/2012 | ............... C10L 5/16 |
|---|---|---|---|
| WO | 2016168894 | 10/2016 | |

OTHER PUBLICATIONS

Dahmen, Nicolaus et al., The bioliq bioslurry gasification process for the production of biosynfuels, organic chemicals, and energy, Energy, Sustainability and Society, Feb. 27, 2012 (Feb. 27, 2012), pp. 1-44, XP055466847, Berlin/Heidelberg, DOI: 10.1186/2192-0567-2-3, retrieved from the internet URL: https://energsustainsoc.springeropen.com/track/pdf/10.1186/2192-0567-2-3.

International Search Report for International Application PCT/US2017/059486, dated Apr. 20, 2018.

* cited by examiner

SYSTEM FOR PRODUCING BIOCOAL AND BIOCHAR USING A ROTARY COMPRESSION UNIT

CROSS-REFERENCE TO RELATED APPLICATIONS

This application claims the benefit of and priority to U.S. application Ser. No. 62/415,831 filed on Nov. 1, 2016. The disclosure of the above application is incorporated herein by reference.

FIELD

The present disclosure relates generally to a system of processing biomass and forming bioproducts. More specifically this disclosure relates to a system and method of producing biocoal, and biochar and the products formed therefrom.

BACKGROUND

The statements in this section merely provide background information related to the present disclosure and may not constitute prior art.

U.S. Pat. No. 9,140,495 to Ferrell et al. and U.S. Pat. No. 8,667,706 to Smith et al. disclose a Rotary Compression Unit (RCU) that is based on frictional carbonization. The RCU can perform a variety of tasks with biomass including but not limited to drying, pyrolysis, partial pyrolysis, biocoal fuel production, and biochar production. In some cases, biocoal fuel can readily be produced in a RCU with BTU contents exceeding biocoal of traditional coal sources such as Powder River Basin coal. For example, biocoal from an RCU can produce 8400 BTU/lb. versus Powder River Basin Coal production of 7800 BTU/lb. Biochar can be produced readily on the RCU but can create a bio-oil and bio-tar waste disposal problem. With limited markets currently available for these products, a process and apparatus that eliminates waste streams is desired.

SUMMARY

The present disclosure generally provides a system for producing biocoal and biochar. The system includes at least one rotary compression unit (RCU) having a barrel, a compression screw housed within the barrel, a feed for receiving biomass and at least one exit for releasing biochar and gasses formed in the RCU. At least one condenser for condensing at least a portion of the gasses. At least a portion of the gasses are pyrolysis gasses and are condensed back into the biochar to form biocoal. A first exit stream is formed that includes biochar and at least a portion of remaining gasses, and a second exit stream is formed that includes biocoal. The system further includes a gas crossover connecting the first and second exit stream and having a mechanism for transporting gasses from the first exit stream to the second exit stream thereby condensing at least a portion of the remaining gasses into the biocoal. The biocoal produced can define a higher BTU content as compared with traditional biocoal. The system can further include a first condenser for receiving biochar and at least a portion of gasses and forming the first exit stream and a second condenser for receiving biocoal and forming the second exit stream. The gas crossover connects the first and second condenser. The gasses can be pyrolysis gasses and the gas crossover can be a pyrolysis gas crossover. The condenser or condensers can be reflux condensers. In one aspect of the present disclosure, a first and a second RCU are provided wherein the first RCU produced biochar and is connected to a first condenser for producing the first exit stream and the second RCU produces biocoal connected to a second condenser for producing the second exit stream.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings in which.

Figure 1:
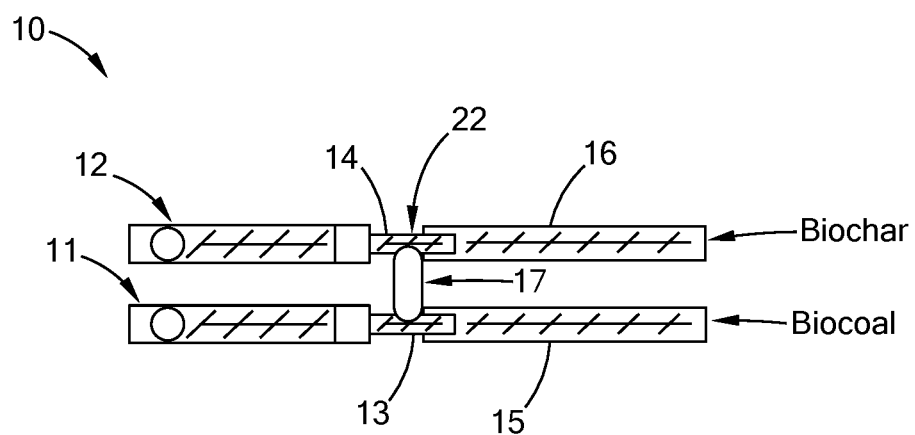
FIG. 1 is a schematic of a dual RCU system for forming biochar and biocoal according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure provides for a coproduct strategy that eliminates liquid waste streams. The system produces an increase in biocoal fuel BTU content by condensing biochar gasses into biocoal fuel thereby reducing or eliminating liquid waste streams. Systems for the production of bioproducts using an RCU are disclosed in U.S. patent application Ser. Nos. 15/263,264 to Heimann et al., U.S. patent application Ser. No. 15/210,559 to Heimann et al., U.S. patent application Ser. No. 15/140,409 to Heimann, and U.S. patent application Ser. No. 15/066894 to Heimann et al., and 62/266,010, the contents of which are incorporated herein by reference in their entirety.

According to the present disclosure, a system is provided that utilized two RCUs, one for producing biochar and another for producing biocoal. A first RCU concurrently produces biochar and pyrolysis gas. A second RCU can then be configured for biocoal fuel. In a second RCU, biocoal is produced when pyrolysis gas is condensed within pores of the biochar to produce an increased BTU solid fuel. In the present disclosure, two RCUs are provided, which can be positioned proximate or side by side to each other, for example. Each RCU is configured to produce a different product, namely biocoal fuel and biochar. Pyrolysis gas from the biochar line can then condensed into the biocoal fuel resulting from the second RCU. This is possible due to available pore space in the biocoal fuel that is not completely filled with its own gas stream. The net result would be a higher BTU content product for biocoal fuel and a value-added product for the biochar line.

In one form of the present disclosure, one RCU is provided that includes two compression screws, one for biocoal fuel and one for biochar. This can provide start-up and process management efficiencies as well as simplifies pyrolysis gas management.

Referring to FIG. 1, the present disclosure provides a system 10 for producing bioproducts that includes two reflux condensers 13 and 14 and two cooling augers 15 and 16 connected to two separate RCUs 11 and 12. One RCU 11 is responsible for producing biocoal fuel and the other RCU 12 for producing biochar. The pyrolysis gas crossover 17 occurs prior to reaching the cooling augers and includes of a method to transport gas from the biochar production line into the biocoal fuel production line; thus creating two gas streams to be condensed into the pores of the biocoal fuel rather than only a single stream.

Figure 2:
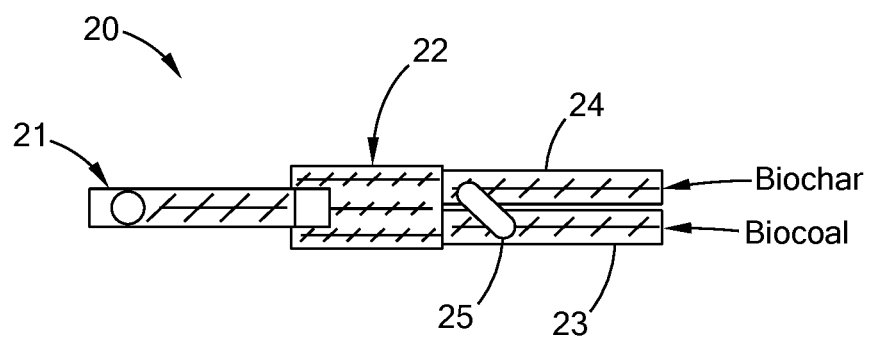
FIG. 2 is a schematic of a single RCU with dual cooling augers for forming biochar and biocoal according to the present disclosure and FIG. 3 is a graph that depicts the volatile matter, oxygen, and fixed carbon changes as biomass moves from wood to meta-anthracite.

Referring to FIG. 2, another form of a bioproduct production system 20 of the present disclosure is shown. System 20 includes one RCU 21 producing frictionally carbonized biomass which is expelled into one reflux condenser 22. From this point, the stream is split into two cooling augers: a first cooling auger 23 for biocoal fuel and a second cooling auger 24 for biochar. The pyrolysis gas crossover 25 occurs at the two cooling augers and includes of a method for transporting pyrolysis gas from the biochar line into the biocoal fuel line.

Biocoal fuel, with additional levels of bio-oil added than typical production will yield a higher weight product to increase production quantities, driving cost down. The production of biochar by this process can be a first-of-kind approach—production of char as a co-product and not a by-product.

As described in the patent applications previously cited, a typical biomass processing system having an RCU generally comprises a feeding mechanism, at least one RCU, at least one of a reflux condenser or a gas management manifold, an aftercooler stage, and an exit mechanism. Along the entire length of the system, the various portions may also be described to comprise various zones, namely, auto acid hydrolysis, hydrothermal carbonization, steam explosion and/or gas pyrolysis, recapture carbonization, and cooling condensation. The RCU includes a compression screw that rotates in a barrel and optionally, one or more flow disruptors. The biomass fed into the barrel moves through by way of the compression screw causing friction and compression.

High Pressure Pyrolysis: RCUs utilize compression and friction of biomass material under the Second Law of Thermodynamics to produce biocoal fuel and/or biochar, among other products. It was also determined that this method operates on high pressure pyrolysis methods. The high pressure is derived from the compression screw applying friction and increasing pressure on material as the biomass moves through the barrel to be expelled to a condenser such as a reflux condenser or the like. Vakalis, et al. (2016) describes a process of the RCU and the methods of increasing temperature through increased pressures and friction of the biomass. The high pressure is observed and believed to be one of the key parameters in producing the carbonaceous biochar or biocoal fuel using the RCU. Conventional pyrolysis resulting in the charring of biomass begins at 270-300° C. (518-572° F.) in the absence of oxygen. The RCU functions at a lower temperature range of 121-204° C. (250-400° F.). This lower temperature range for carbonization is the result of high pressure conditions in the RCU; and the resultant pressure acts as a catalyst in the carbonization process, allowing for much lower than conventional temperatures for pyrolysis.

Figure 3:
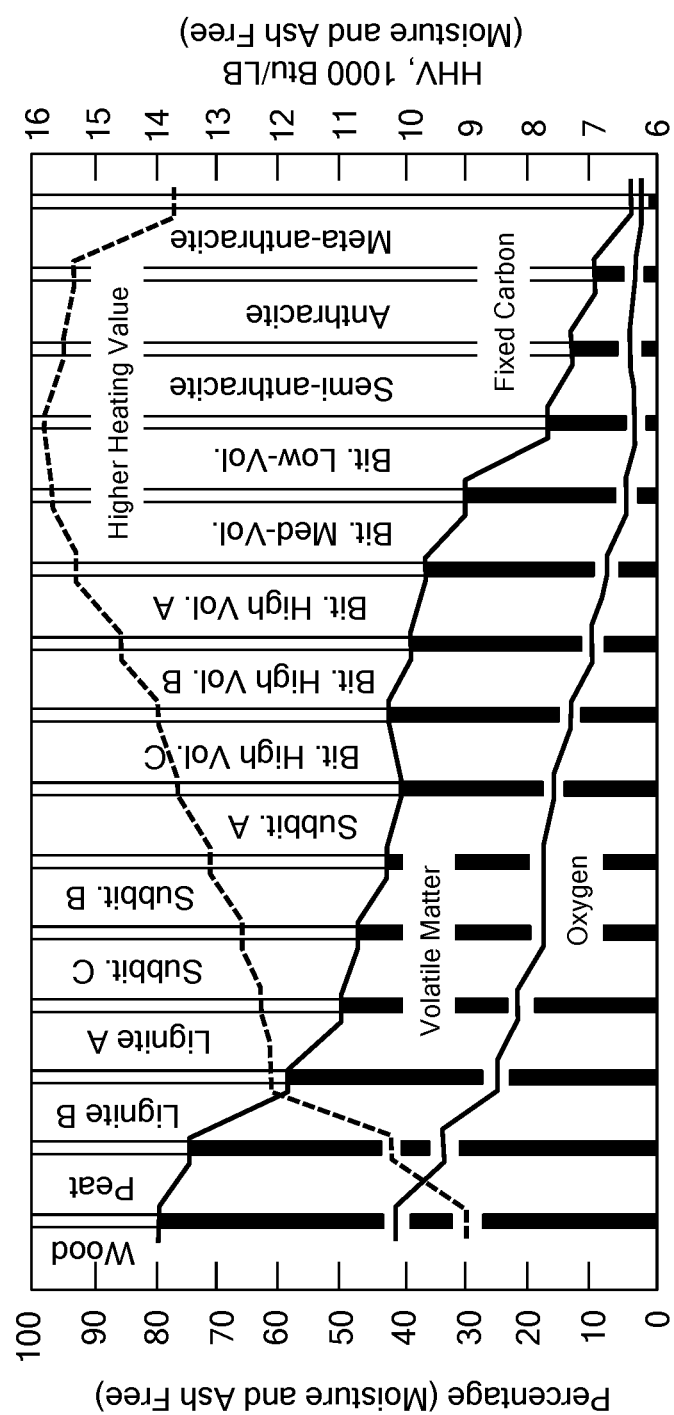

High pressures have shown to increase the solid yield of carbon in the char residue, thus increasing the yield of biochar overall as compared to slow pyrolysis or low pressure pyrolysis. A RCU can operate in the range of 18-40 bar under normal conditions. The high pressures of this pyrolysis method can also effect the release of volatiles, char morphology, and the surface area of the char. These changes can correlate to development of graphene precursors or graphite-like structures (See Newalkar, 2014). Graphite is considered to be the highest rank of coal and is a densely packed, high carbonaceous material that is the result of intense pressures. Biochars formed at higher pressures have been shown to exhibit different structures and morphologies than those of traditional pyrolysis. Elevated pressure can cause swelling of the particles and higher porosities with denser structures (. FIG. 3 depicts the volatile matter, oxygen, and fixed carbon changes as biomass moves from wood to meta-anthracite. Meta-anthracite would be very similar to graphite and considered the highest grade of coal.

High Oxygen Char: the inventors have discovered and produced biochar using the RCU which has exhibited many growth promoting characteristics including increasing germination rate by one day, increasing plant robustness, and increasing growth rate overall in studies completed. This includes improvement over other commercial biochar sources uity. This improvement is a result of the process the RCU uses which is very different from traditional fast or slow pyrolysis. High pressure and frictional conditions of an RCU may contribute to its unique high oxygen characteristics. High oxygen levels are considered between to be a molar ratio of oxygen to carbon (O:C) that is about 0.5 to 1.0. Biochar produced by the process described herein can produce an O:C ratio of between 0.5 and 0.8. This is ratio can also be referred to as to the percent by weight of the two elements and deemed "50/30" char. The "50/30" char includes 50-60% carbon by weight and 30-40% Oxygen by weight. High oxygen content biochar can be beneficial in many ways. Biochars containing functional groups that are mainly oxygen containing experience increased cation and ion exchange capacities. Increased ion exchange capacitates are vital in not only plant health but, for the health of soil microbes responsible for nutrient exchange and organic material of the soil. By adding a high oxygen containing biochar to the soil, oxygen content overall of the soil is increased which is important for aerobic respirations of microbes, germination, and nutrient absorption. Oxygen at a molecular level is required for nutrient uptake at the root zone. Higher oxygen containing biochars are also vital in the binding of metal ions in heavy metal containing soils. Carboxyl, hydroxyl, and phenolic groups found on biochar are key in the stabilization of heavy metals such as copper, cadmium, and the like.

Experiments have shown biochars produced with an RCU increase growth rate of plants, increase the robustness of established plants, increase germination rate by at least one day, improve uniformity of stand, and increase water holding capacity. The biochars have also proven strong stabilizers of pH in the soil when compared to biochars produced using traditional slow pyrolysis. Increasing the germination rate, robustness and the uniformity of stand are all critical to commercial agriculture applications where any plants lagging behind in growth or robustness can act as a weed to the crop as a whole.

Oxygen content of the biochar also has an effect on the half-life of the biochar. The O:C molar ratio appears to be a measure of how volatile the carbon structures of the biochar are and thus, how long the biochar will survive when in the soil. Biochars produced in normal pyrolysis conditions with an O:C molar ratio of about 0.32 to about 0.72 can expect a half-life of approximately 100 to 500 years. Biochars produced by way of an RCU would fall within this half-life range due to the O:C ratio being approximately between 0.5 and 0.8.

Conventionally, products are offered commercially that are meant to slow release oxygen into the soil using peroxides and peroxide salts without the integration of oxygen into the biochar. The use of higher oxygen containing biochar particles delivers not only slow releasing oxygen compounds, but also a dose of biochar to increase soil health, increase the water holding capacity of soils, and build soil levels.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A system for producing biocoal and biochar comprising:
   at least one rotary compression unit (RCU) having a barrel, a compression screw housed within the barrel, a feed for receiving biomass and at least one exit for releasing biochar and gasses formed in the RCU;
   at least one condenser for condensing at least a portion of the gasses, wherein at least a portion of the gasses are pyrolysis gasses;
   a first exit stream including biochar and at least a remaining portion of the gasses;
   a mechanism for condensing at least a portion of the pyrolysis gasses into the biochar to form biocoal; and
   a second exit stream including biocoal.

2. The system of claim 1, wherein the biocoal defines a higher BTU content as compared to traditional biocoal.

3. The system of claim 1 further comprising a first condenser for receiving biochar and at least a portion of the gasses and forming the first exit stream and a second condenser for receiving biocoal and forming the second exit stream, and a gas crossover that connects the first and second condenser.

4. The system of claim 3, wherein at least the portion of the gasses are pyrolysis gasses and the gas crossover is a pyrolysis gas crossover.

5. The system of claim 1, wherein the condenser or condensers are reflux condensers.

6. The system of claim 1 further comprising a first and a second RCU wherein the first RCU produced the biochar and is connected to a first condenser for producing the first exit stream, and the second RCU produces the biocoal, the second RCU connected to a second condenser for producing the second exit stream.

7. The system of claim 1, further comprising a gas crossover connecting the first and second exit stream and having a mechanism for transporting a portion of the remaining gasses from the first exit stream to the second exit stream thereby condensing at least the portion of the remaining gasses into the biocoal.

8. The system of claim 7, wherein the gas crossover includes the mechanism for condensing at least a portion of the pyrolysis gasses into the biochar to form biocoal.

* * * * *